US012679564B2

(12) United States Patent
Brophy et al.

(10) Patent No.: US 12,679,564 B2
(45) Date of Patent: Jul. 14, 2026

(54) SPACE-BASED DATA CENTERS

(71) Applicants: California Institute of Technology, Pasadena, CA (US); Sophia Space, Inc., Pasadena, CA (US)

(72) Inventors: John R. Brophy, Valencia, CA (US); Leon Alkalai, Studio City, CA (US); Sergio Pellegrino, Pasadena, CA (US); Jonathan Sauder, La Crescenta, CA (US); Timothy P. McElrath, Pasadena, CA (US); Douglas J. Sheldon, Pasadena, CA (US); Don J. Hunter, LaVerne, CA (US)

(73) Assignees: California Institute of Technology, Pasadena, CA (US); Sophia Space, Inc., Pasadena, CA (US)

( * ) Notice: Subject to any disclaimer, the term of this patent is extended or adjusted under 35 U.S.C. 154(b) by 13 days.

(21) Appl. No.: 18/906,111

(22) Filed: Oct. 3, 2024

(65) Prior Publication Data

US 2025/0108938 A1 Apr. 3, 2025

Related U.S. Application Data

(60) Provisional application No. 63/542,183, filed on Oct. 3, 2023.

(51) Int. Cl.
B64G 1/22 (2006.01)
B64G 1/10 (2006.01)
(Continued)

(52) U.S. Cl.
CPC ........... B64G 1/223 (2023.08); B64G 1/1007 (2013.01); B64G 1/443 (2013.01); B64G 1/503 (2013.01); B64G 1/506 (2013.01); B64G 1/428 (2013.01)

(58) Field of Classification Search
CPC ....... B64G 1/1007; B64G 1/223; B64G 1/503
See application file for complete search history.

(56) References Cited

U.S. PATENT DOCUMENTS 7,583,506 B1 * 9/2009 Huang ................. H05K 1/0272
361/700
10,696,428 B2 6/2020 Pellegrino et al.
(Continued)

FOREIGN PATENT DOCUMENTS

WO 2025183745 A2 9/2025
WO 2025183745 A9 10/2025

OTHER PUBLICATIONS

International Search Report and Written Opinion for International Application No. PCT/US2024/049866, Search completed Sep. 30, 2025, Mailed Sep. 30, 2025, 8 Pgs.
(Continued)

*Primary Examiner* — Nicholas McFall
(74) *Attorney, Agent, or Firm* — KPPB LLP

(57) ABSTRACT

In many embodiments of the invention, a space-based data center includes orbital server modules configured to be deployed in space, each module including a communication subsystem for module-to-module communications to form a data center, tiles arranged in a planar array, where each tile has a layered structure including solar cells forming a layer across a first surface, thermal radiator panels forming a layer across a second surface, electronic components distributed laterally in a layer between the layer of solar cells and the layer of thermal radiator panels, where each electronic component receives power locally from solar cells and rejects heat to the thermal radiator panel beneath it, where a first subset of tiles are compute tiles in which the electronic components include one or more computing processors and memory, and where a second subset of tiles are support tiles (Continued)

in which the electronics components include network switches and energy storage.

20 Claims, 15 Drawing Sheets

(51) Int. Cl.
  *B64G 1/44*      (2006.01)
  *B64G 1/50*      (2006.01)
  B64G 1/42      (2006.01)

(56)          References Cited

U.S. PATENT DOCUMENTS

| 11,772,826 | B2 | 10/2023 | Pellegrino et al. | |
|---|---|---|---|---|
| 12,060,171 | B2 * | 8/2024 | Modrzewski | ............ B64G 1/66 |
| 2019/0149634 | A1 | 5/2019 | Coleman et al. | |
| 2020/0366237 | A1 | 11/2020 | Hernandez Bahlsen et al. | |
| 2021/0303290 | A1 | 9/2021 | Schmit et al. | |
| 2022/0034607 | A1 | 2/2022 | Marquis | |

OTHER PUBLICATIONS

"NTT and SKY Perfect JSAT Conclude Collaboration Agreement on New Space Enterprise to AID Realization of a Sustainable Society", NTT Newsroom [online], May 20, 2021, Retrieved from the Internet [URL: https://group.ntt/en/newsrelease/2021/05/20/210520a.html].

* cited by examiner

| Tile 4 | Tile 3 | Tile 2 | Tile 1 |
|--------|--------|--------|--------|
| Tile 8 | Tile 7 | Tile 6 | Tile 5 |
| Tile 12 | Tile 11 | Tile 10 | Tile 9 |
| Tile 16 | Tile 15 | Tile 14 | Tile 13 |

START

Decommission retired orbital server module — 1202

Move retired module out of position/orbit — 1204

Deliver replacement module to space — 1206

Expand replacement module — 1208

Raise to orbit — 1210

Insert module into data center formation — 1212

Commence computing operations — 1214

END

SPACE-BASED DATA CENTERS

CROSS-REFERENCE TO RELATED APPLICATIONS

The current application claims priority to U.S. Provisional Application No. 63/542,183, filed Oct. 3, 2023, entitled Space Server Farms, the disclosure of which is incorporated herein by reference.

STATEMENT OF GOVERNMENT SUPPORT

This invention was made with government support under Grant No. 80NMO0018D0004 awarded by NASA (JPL). The government has certain rights in the invention.

FIELD OF THE INVENTION

The present invention relates to space structures and more specifically to spacecraft housing a modular system of data center servers.

BACKGROUND OF THE INVENTION

Large data server farms on Earth consist of tens to hundreds of thousands of computers or more and petabytes of memory storage that consume huge amounts of electrical power. For example, in 2021 it is estimated that worldwide data center usage amounted to 2-3% (480-660 TWh) of global electricity. Google alone consumed 21.8 TWh of electricity in 2022, representing an amount larger than the individual consumption of 141 countries.

Data centers are responsible for global greenhouse gas emissions comparable to the airline industry. The enormous demand for electricity to operate and cool sever farms creates a large environmental problem that is expected to get worse over time as the demand for data usage continues growing at a rapid pace. Data centers also use a huge amount of fresh water for cooling. US data centers alone consumed 175 billion gallons of water in 2021.

Artificial Intelligence (AI) computing demand is doubling few months, outstripping Moore's Law. One training run for ChatGPT consumes as much energy as 120 households over a year.

The Semiconductor Research Corporation January 2021 Decadal Plan for Semiconductors projects that the total energy required for computing will exceed the world's total energy production by 2040. The current path is unsustainable and is on a trajectory in which the world's computational capability will be severely limited by energy availability.

SUMMARY OF THE INVENTION

In many embodiments of the invention, a space-based data center includes orbital server modules configured to be deployed in space, each module including a communication subsystem configured for module-to-module communications to form a complete data center, a command subsystem configured to adapt to changing the number of modules in the data center, a plurality of tiles arranged in a planar array, where each tile has a layered structure including a plurality of solar cells forming a layer across a first surface of the planar array, a plurality of thermal radiator panels forming a layer across a second surface of the planar array, a plurality of electronic components distributed laterally in a layer between the layer of solar cells and the layer of thermal radiator panels, where each electronic component receives power locally from solar cells that are proximate to it and rejects heat to the thermal radiator panel beneath it, where a first subset of tiles within the plurality of tiles are compute tiles in which the electronic components include one or more computing processors and memory, and where a second subset of tiles within the plurality of tiles are support tiles in which the electronics components include network switches and energy storage.

In some embodiments of the invention, the at least one orbital server module further comprising a heat spreader layer between the thermal radiator panels and the electronic components where material of the heat spreader layer contacts at least some of the electronic components.

In several embodiments of the invention, the heat spreader layer is made of thermal pyrolytic graphite (TPG).

In additional embodiments of the invention, the heat spreader layer is made of heat pipes.

In more embodiments of the invention, the heat spreader layer is segmented in a manner to enable the module to be compacted for launch and subsequently deployed.

In further embodiments of the invention, the heat spreader layer is flexible in a manner to enable the module to be compacted for launch and subsequently deployed.

In still additional embodiments of the invention, the thermal radiator panels are made of aluminum cladding.

In still more embodiments of the invention, the at least one orbital server module further comprising a thermal break area between the solar cells and the electronic components.

In still further embodiments of the invention, the majority of the thermal break area comprises empty space with supports to maintain structural integrity of the thermal break area.

In yet still more embodiments of the invention, the majority of the thermal break area comprises thermally insulating materials.

In many embodiments of the invention, the tiles are positioned in the same orientation such that their solar cells all face the same direction.

In some embodiments of the invention, the at least one orbital server module further comprising a propulsion system comprising a plurality of thrusters configured to propel the module for orbit transfer, attitude control, momentum management, and station keeping.

In several embodiments of the invention, the electronic components are mounted to flexible printed circuit boards (PCBs).

In additional embodiments of the invention, the orbital server module remains in a compacted configuration until it reaches orbit.

In more embodiments of the invention, the plurality of tiles arranged in a planar array forms a generally flat and thin shape.

In further embodiments of the invention, the electronic components of the first subset of tiles include two or more processors.

In still additional embodiments of the invention, the electronic components of the first subset of tiles further include power conversion electronics configured to provide power to the computing processors and memory.

In still more embodiments of the invention, the electronic components of the second subset of tiles further include one or more batteries as energy storage.

In still further embodiments of the invention, the network switches of the second subset of tiles are configured to route data between tiles of the first subset of tiles.

In yet still more embodiments of the invention, the tiles of the first subset of tiles and the second subset of tiles are organized in groups of three tiles from the first subset and one tile from the second subset.

BRIEF DESCRIPTION OF THE DRAWINGS

FIG. 6 illustrates a layout of tiles of an orbital server module in accordance with embodiments of the invention.

DETAILED DISCLOSURE OF THE INVENTION

Figure 1:
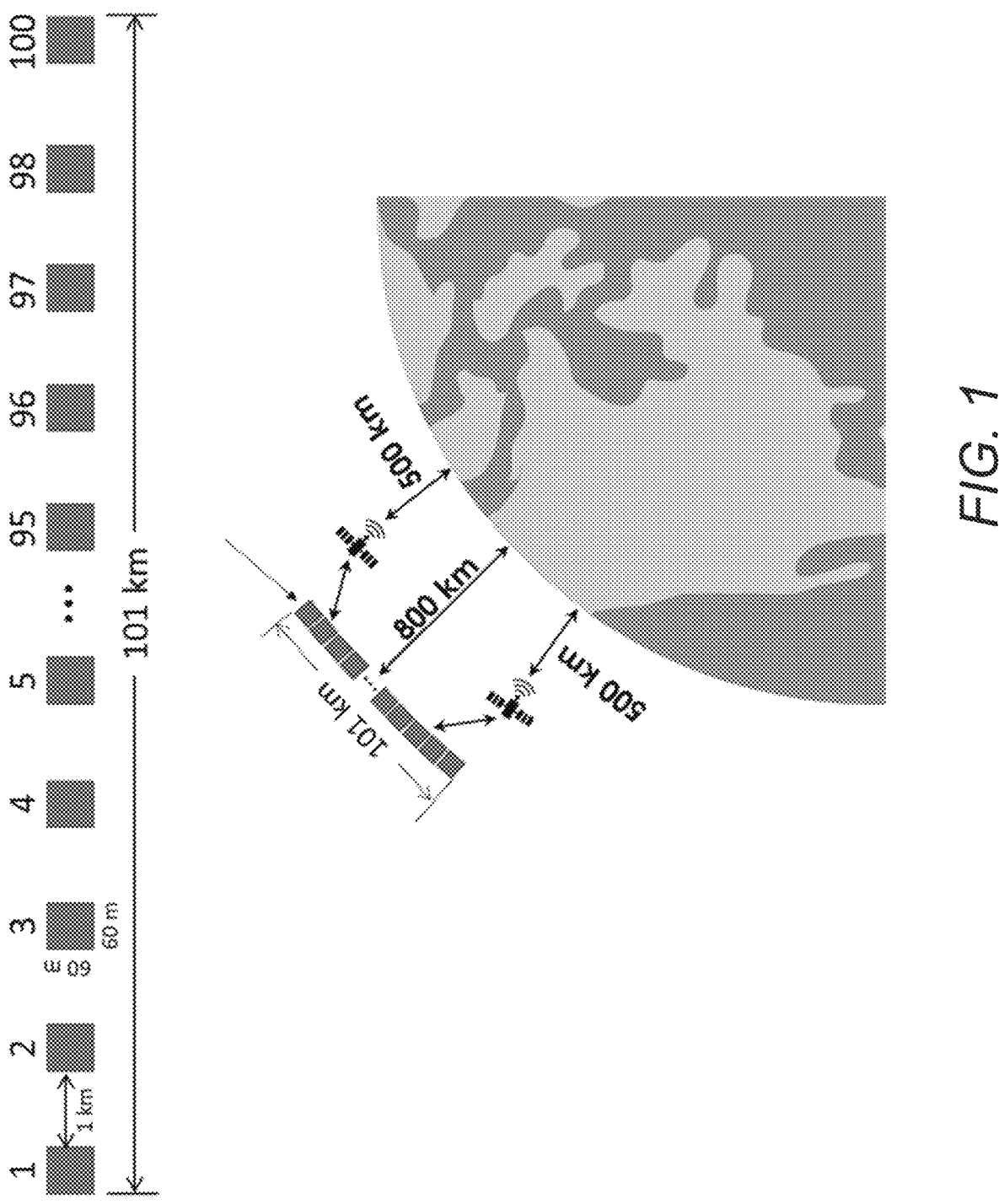
FIG. 1 illustrates a string of pearls configuration of orbital server modules in accordance with several embodiments of the invention.

Turning now to the drawings, systems and methods for deploying data centers in space as formations of orbital server modules are disclosed. In space, data centers can take advantage of effectively limitless energy from the Sun, the cold heatsink of deep space for waste heat rejection, ample room for expansion, reduced physical security costs, and scaling effects that reduce rather than increase costs. Moreover, the environmental impacts of displacing ecosystems, waste, carbon footprint, and expending Earth's resources would be reduced.

Currently, large data centers on the ground typically have power levels in the hundreds of megawatts (MW) or more and data storage capacities ranging from a few petabytes (PB) to exabytes (EB) or more. Space-based data centers in accordance with embodiments of the invention can approximately match ground-based data centers in terms of computing power and data storage to have a meaningful impact. Space-based data center technology solutions in accordance with several embodiments can implement a space server farm with a power level of order 100 MW, approximately 600 Exa-operations per second, and 100 PB of data storage.

Many embodiments of the invention provide an approach to configuring data centers in space in a manner that is scalable, resilient, and adaptable. A space-based data center in accordance with embodiments of the invention includes a formation of orbital server modules in a distributed architecture that is distributed at multiple levels. The data center in many embodiments is composed of multiple modules. The modules can be free-flying spacecraft that are replaceable within the formation. Each module has a design that is modular and hierarchical in layout and structure, being composed primarily of an array of tiles. Each tile has its own power collection, computing, and heat disposal capabilities via components that will be discussed further below. Many of the tiles contain computing hardware akin to the role of servers in a data center. The computing hardware (e.g., processors, memory, etc.) may be distributed around the spacecraft as the tiles that contain them are distributed. The power per unit area required by the distributed compute elements in a module can be matched to the power per unit area from solar cells on the module.

Each orbital server module in accordance with embodiments of the invention may harvest solar power for internal operations, house powerful computing hardware akin to data center servers, communicate data to ground or other space vehicles, organize and communicate with other modules, and dispose of waste heat from electronic operations to space. Orbital server modules may be built on Earth as a compactible structure that can be stored in a bay of a space transport vehicle or launch vehicle and deployed when the vehicle reaches space. In several embodiments, each orbital server module can be dropped from the vehicle at the orbit altitude and may use its onboard propulsion to move to its operational orbit. The modules may maintain a formation by coordinating for station keeping.

Formation of Orbital Server Modules

An architectural approach in many embodiments of the invention divides a large server farm into several smaller, free-flying modules. Each module, having a number of processors and supporting components as will be discussed below, provides computing capabilities similar to groups of servers within a data center. The modules can be deployed in space at a location appropriate for their application. Three different applications can include: low-latency data centers, latency-insensitive data centers (where latency is not important), and data centers where data survivability is key.

A string of pearls server farm architecture in accordance with several embodiments of the invention as illustrated in FIG. 1 includes 100 modules. In a 100 MW (megawatt) server farm, each module has a power level of (i.e., consumes) approximately 1 MW. The modules 1, 2, 3 . . . 100 can be 60 m by 60 m each. The modules can be separated from each other by approximately 1000 m, hence the total length of the string of pearls can be approximately 101 km. To minimize station keeping requirements, the modules preferably can be in the same orbit and may perform cooperative station-keeping with each other.

A sun synchronous orbit (~400 to 1000 km) has low access cost, low amount of radiation, some congestion, and low latency. An orbit altitude of 800 km would have low drag, low congestion, and low radiation. Modules in the string of pearls may communicate with satellites, e.g., those illustrated at 500 km, to relay data to receivers on Earth's surface.

While specific configurations of modules, numbers of modules, power levels, dimensions, and distances are discussed above with respect to FIG. 1, one skilled in the art will recognize that these parameters may vary in accordance with various embodiments of the invention as appropriate to a particular application.

Figure 2A:
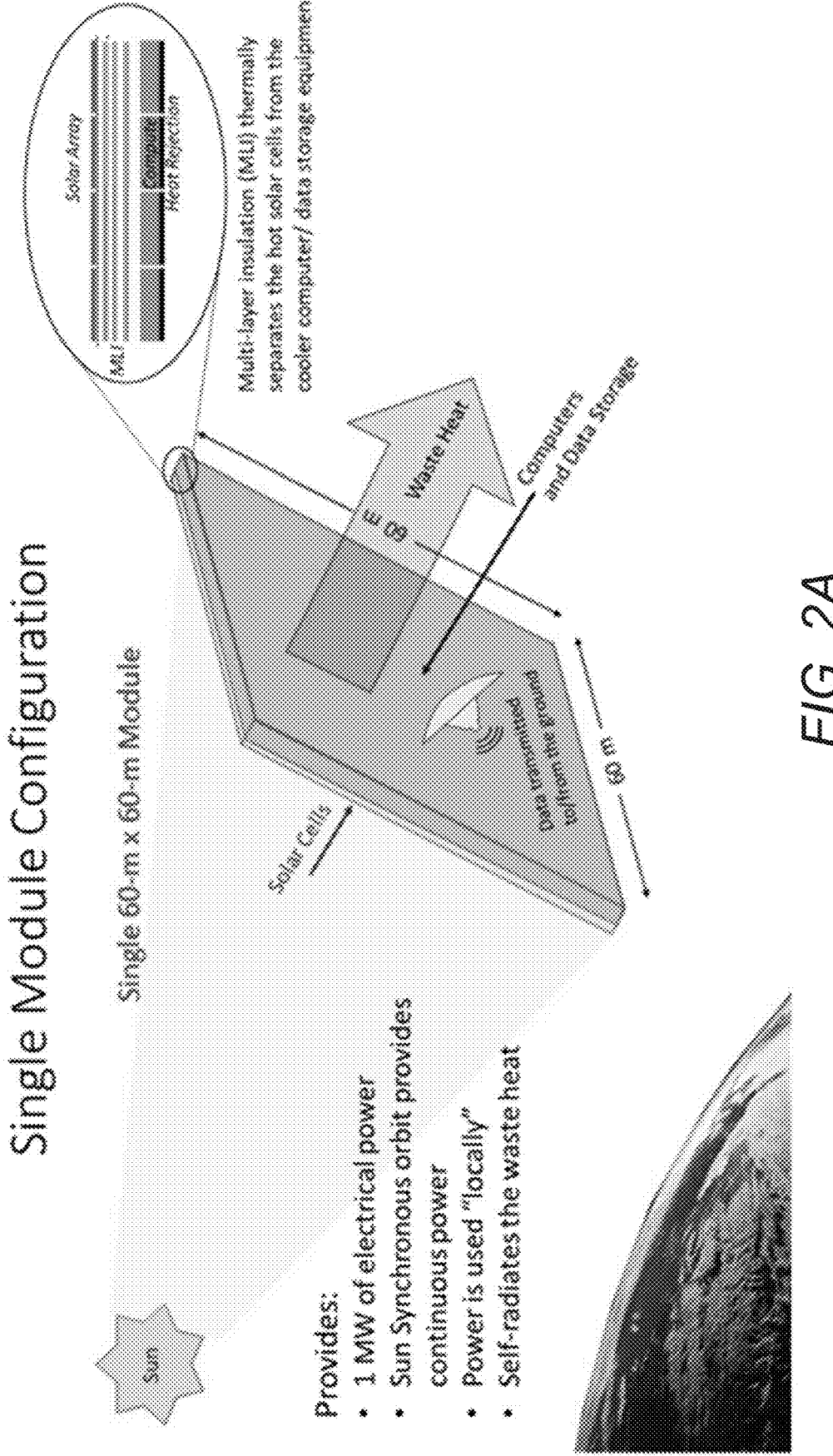
FIGS. 2A and 2B illustrates a theory of operation of an orbital server module in accordance with several embodiments of the invention.
Figure 2B:
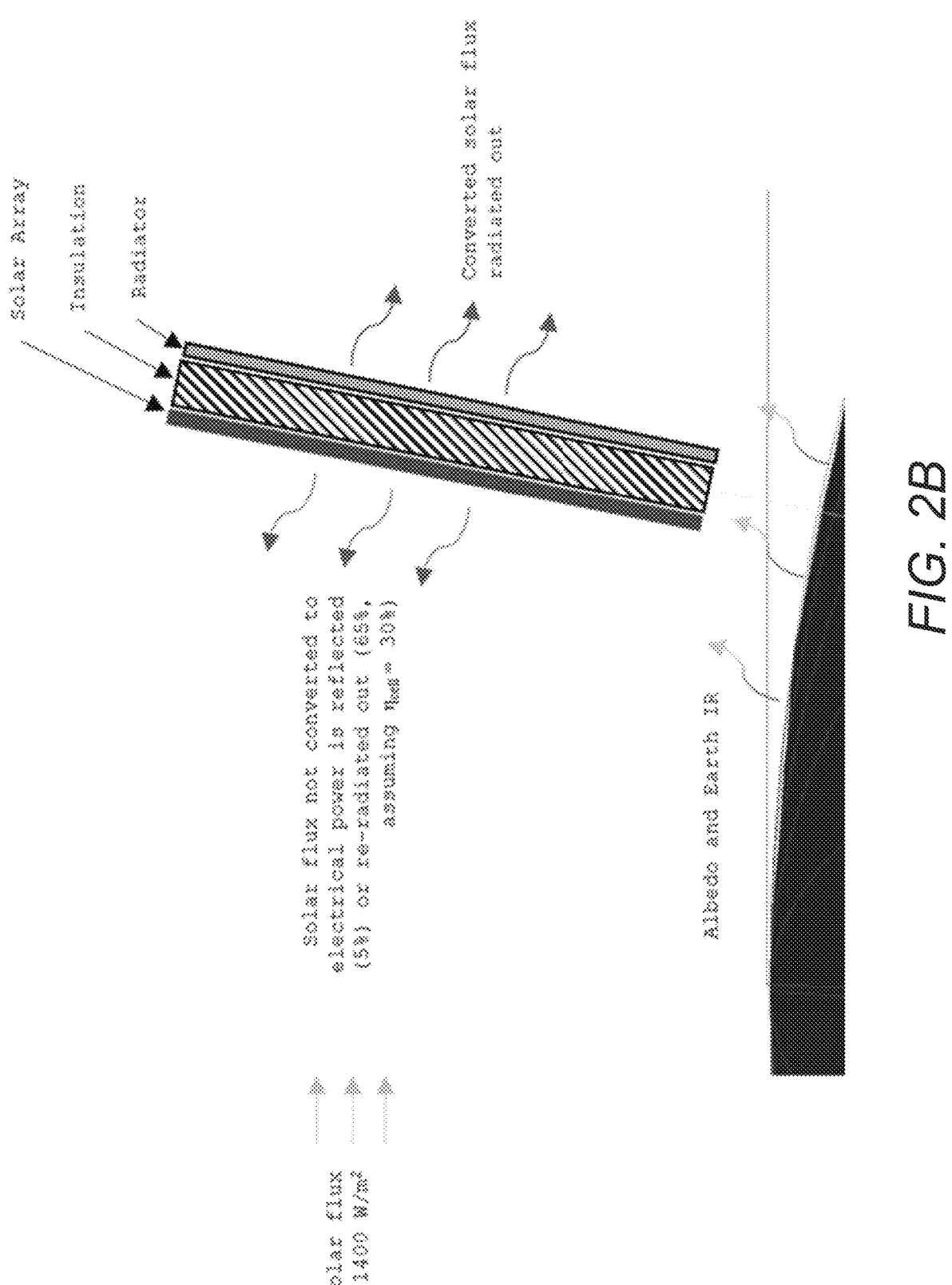
Figure 3:
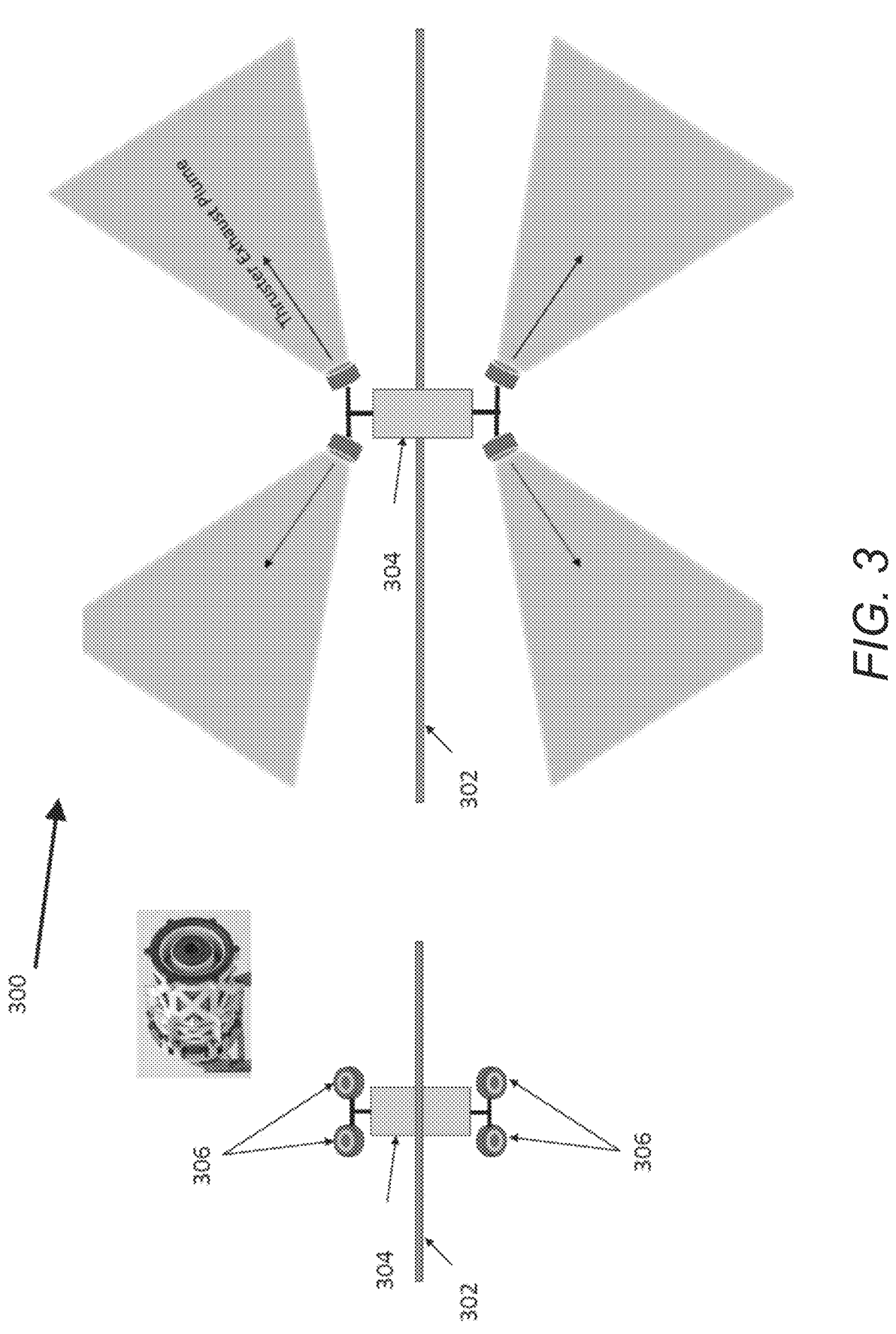
FIG. 3 illustrates a propulsion system of an orbital server module in accordance with several embodiments of the invention.

FIGS. 2 and 3 illustrate a general theory of operation of an individual module within a formation in accordance with an embodiment of the invention. Illustrated is a 60 m by 60 m module that harvests and uses approximately 1 MW of electrical power while in sun synchronous orbit. The module has a flat and wide form factor. The shape provides a broad surface for collecting solar energy and enables a sandwich or layer design to its internal structure, as discussed further below. Solar panels can cover an appropriate fraction of the surface of the module that faces the sun. A next layer behind the solar panels offers insulation in some form, e.g., with an "air gap" of empty space and/or some form of insulating material to reduce the transfer of thermal power from the solar panel layer to other layers. Another middle layer contains circuit boards and mounted electronic and computing components that form the processing capabilities of the module. The components can include networking and communications circuitry to transmit data to and from the ground and/or other satellites or space vehicles. A heat spreader layer after the electronics layer can aid in distributing heat from the electronics layer to reduce hot spots. Finally, a thermal radiator layer on the opposite surface of the module away from the sun helps emit the heat passed through the heat spreader. The layer design is discussed in greater detail below.

Although the above describes operation of a module with reference to FIGS. 2 and 3, one skilled in the art will recognize that any of a variety of structures and approaches may be utilized for modules in accordance with embodiments of the invention as appropriate to a particular application. A data center may be designed with different power requirement and the number and/or power level of modules in the data center sized accordingly with the power requirement. Moreover, the size of a data center in space can be tailored by controlling the number of modules it contains. For example, a 100-MW data center could be expanded to a 150-MW data center by adding fifty new 1-MW modules to the existing formation of modules. New modules may be delivered and integrated into the data center by processes such as those described further below.

Structure of a Module

The shape of a module in many embodiments of the invention generally has a flat, thin profile. In multiple embodiments, it has a flattened shape that can be understood to represent a mechanical configuration in which two dimensions (e.g., length and width) are much larger than a third dimension (e.g., thickness or height), such that the third dimension is a small fraction of the other two dimensions. This wide and flat shape, similar to a thin slab, creates two broad areas (e.g., the top and bottom) that can be used separately for solar energy collection and radiation of heat.

An orbital server module in many embodiments of the invention, as a type of spacecraft, includes a propulsion system, which may operate using electricity, namely electrical power recovered from solar energy using solar cells and converted by power management subsystems. An orbital server module having a propulsion system including thrusters in accordance with embodiments of the invention is illustrated in FIG. 3. The plane of an array of tiles 302 that form the body of the module is arranged around a spacecraft bus 304.

A spacecraft bus in many embodiments of the invention contains spacecraft subsystems, e.g., power, telecommunications, propulsion, guidance navigation & control, command & data handling, structure, thermal, array deployment mechanism, and harnessing. Telecommunications hardware may be used for communication to satellites and/or ground receivers on Earth for an internet connection or to transfer other data. The spacecraft bus may also contain a core router for communication with other modules in the formation. Modules may communicate to each other characteristics such as their location, orientation, speed, and/or other pieces of information that may aid in maintaining their position(s) within the formation. Modules may also communicate information to coordinate any data processing that is distributed across multiple modules in the formation. Inter-module communications may be directed by a spacecraft command & data handling subsystem or other subsystem within a module.

Mounted in four directions around the spacecraft bus 304 are four thrusters 306 that may have gimbals in 2 axes. The thrusters 306 may provide orbit transfer, deorbit, stationkeeping in any direction, and attitude control. For example, Hall-effect thrusters such as Halo 12 from Exoterrra may be used in accordance with embodiments of the invention, although any of a variety of other thrusters may be used. In some embodiments, the thrusters consume power of up to 4 kW and provide torque capability of $1.24 \times 10^{-3}$ Nm. Using a Halo 12 offset from the spacecraft center of gravity by 1 m, a thrust level of 0.10 N would provide torque of 0.10 Nm. This is 0.10 Nm/$1.24 \times 10^{-3}$ Nm=80 times the torque that would be required. The thruster could operate at a duty cycle of ⅛₀, or about 110 hours per year, which is about 18 minutes a day.

While a specific configuration of a propulsion system is discussed above with respect to FIG. 3, one skilled in the art will recognize that any of a variety of propulsion systems may be utilized in accordance with embodiments of the invention as may be appropriate to a particular application. Furthermore, different types, numbers, and orientations of thrusters are contemplated.

Figure 4:
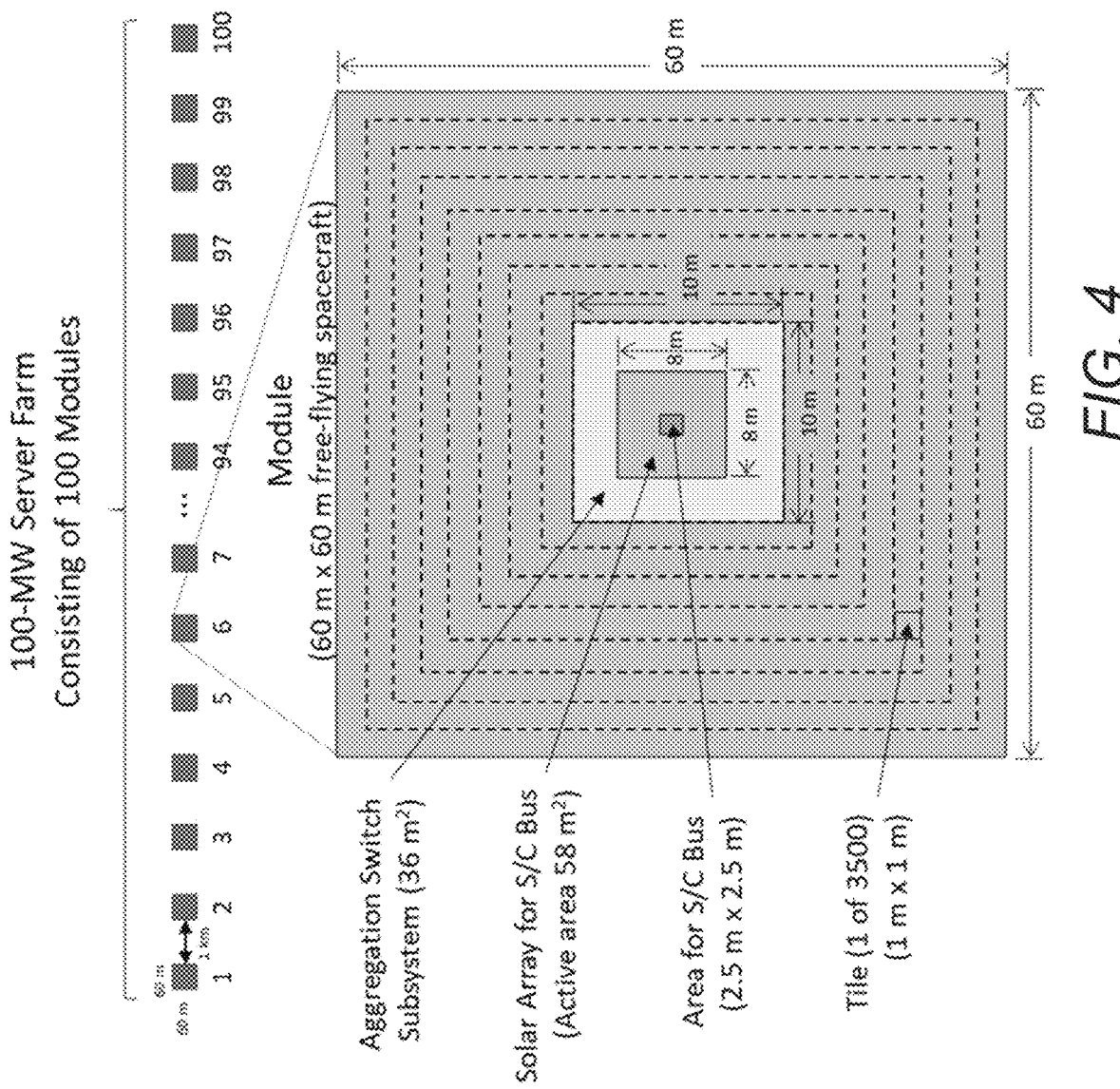
FIG. 4 illustrates a configuration of power collection and management components by tiles in an orbital server module in accordance with embodiments of the invention.

A configuration of power collection and management components in an orbital server module in accordance with an embodiment of the invention is illustrated in FIG. 4. The 60 m by 60 m module has at its center a spacecraft bus in an area of 2.5 m by 2.5 m. Around the spacecraft bus is a solar array for the spacecraft bus that occupies an 8 m by 8 m area. Around the solar array for the spacecraft bus is an area of 10 m by 10 m for an aggregation switch subsystem that connects together the computing components of the tiles in the module. The remaining area is covered with solar cells that can power the computer processors and other electronic components of the tiles that they are part of. As will be discussed further below, solar cells may be part of tiles that form a distributed modular arrangement of components across the orbital server module.

While a specific configuration of power collection and management components is discussed above with respect to FIG. 4, one skilled in the art will recognize that any of a variety of power collection and management components may be utilized in accordance with embodiments of the invention as may be appropriate to a particular application. Furthermore, different types, numbers, and orientations of solar energy collection and conversion devices are contemplated.

Figure 5:
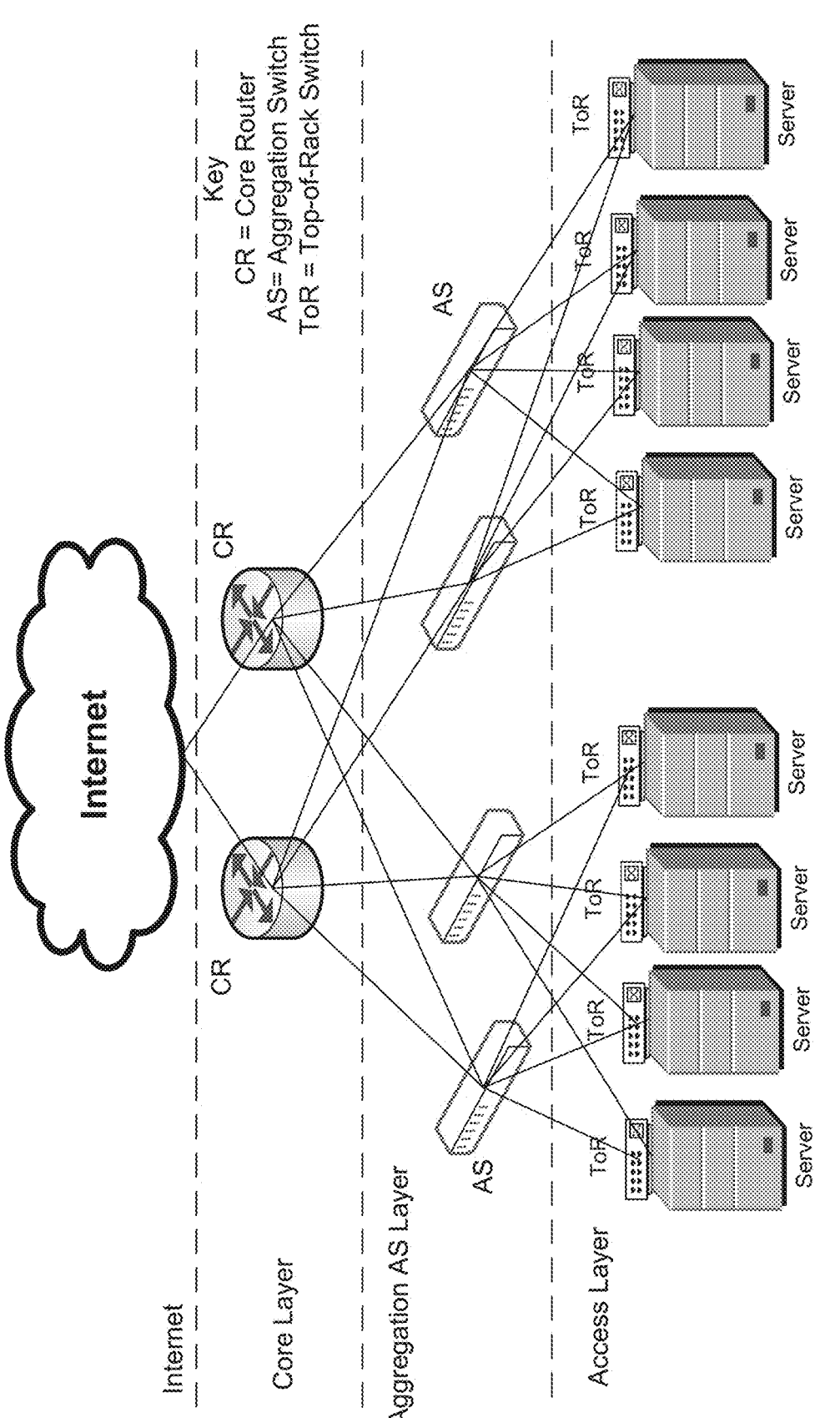
FIG. 5 illustrates a network topology of an orbital server module in accordance with embodiments of the invention.

FIG. 5 illustrates a data center network topology for an orbital server module that may be utilized in accordance with embodiments of the invention. Computer processors, memory, and storage that make up servers are contained in tiles, with top-of-rack (ToR) switches on each set of components that would comprise a server. Communications from ToR switches are aggregated to switches in an aggregation subsystem on each module. Communications from switches in the aggregation subsystem then combine to routers in a core router layer in the module. The core routers then communicate the data to outside of the module, e.g., to Earth ground stations, other modules, or other space vehicles.

While a specific configuration of network topology and components is discussed above with respect to FIG. 5, one skilled in the art will recognize that any of a variety of network topologies and components may be utilized in accordance with embodiments of the invention as may be appropriate to a particular application. Furthermore, different types, numbers, and hierarchies of network devices are contemplated.

Tile Architecture

Figure 6:
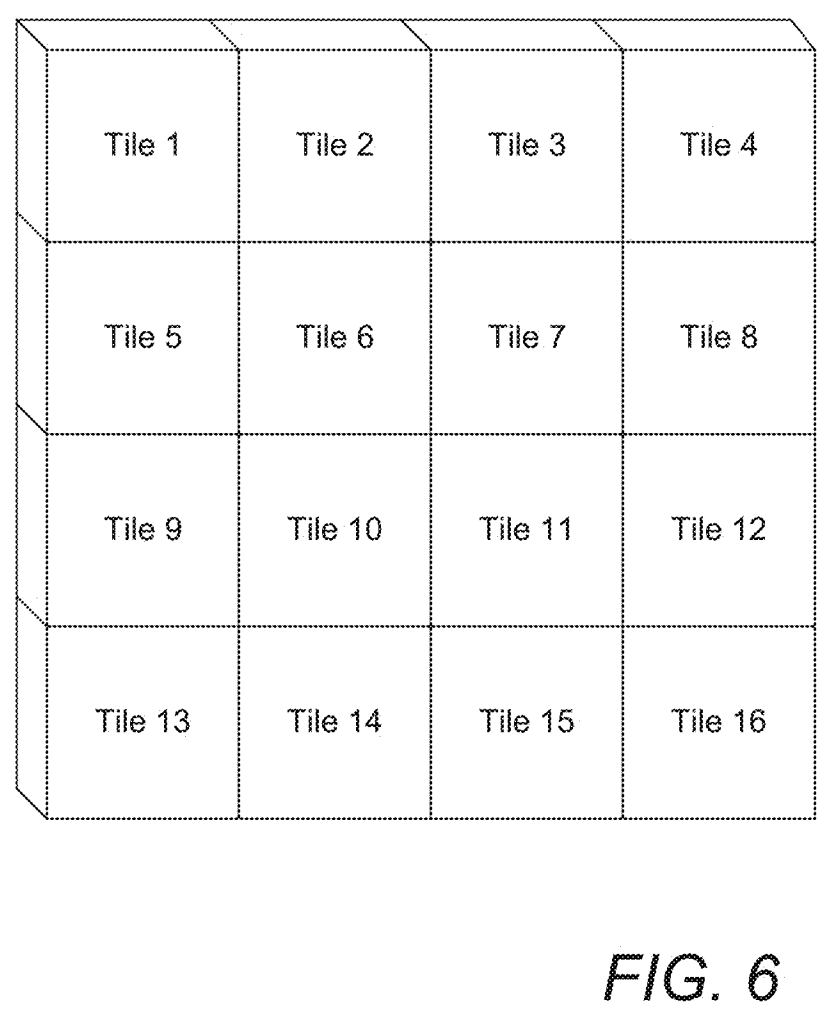

An architectural unit that is repeated in the modular system in many embodiments of the invention can be referred to as a tile. Each tile maintains structural layers of a module described below (e.g., solar cells, air gap or thermal break, insulation, circuit board, electronics and computing elements, heat spreader, thermal radiator) and may differ in the specific components within the electronics and computing layer. Within a module, tiles may be arranged in the same orientation (e.g., with all solar panels aligned to one side) and in a single layer and/or approximately in the same plane. An example arrangement of tiles is illustrated in FIG. 6. The arrangement shows Tiles 1 through 16 that form at least part of a module. This arrangement within a plane corresponds with a planar arrangement as shown in FIG. 4. While the arrangement here is in a regular grid pattern with aligned rows, one skilled in the art will recognize that the tiles need not be aligned and may be offset or in other arrangements.

Structural components of a tile can be arranged as sandwich or layered design in accordance with embodiments of the invention. Furthermore, different types of tiles may be used throughout a distributed array of tiles in an orbital server module. In some embodiments, tile types are differentiated by the electronic components and/or role. An example layered structure of a computing tile in accordance with several embodiments of the invention is illustrated in FIG. 7. For the purposes of the description below, directions (e.g., top, bottom, above, below, vertical, horizontal) will be used with respect to the orientation of the tile structure shown in the figure for reference purposes only. One of ordinary skill in the art will recognize that the orientation is arbitrary for discussion purposes, and that a tile or a module may be in any position or orientation when implemented.

Figure 7A:
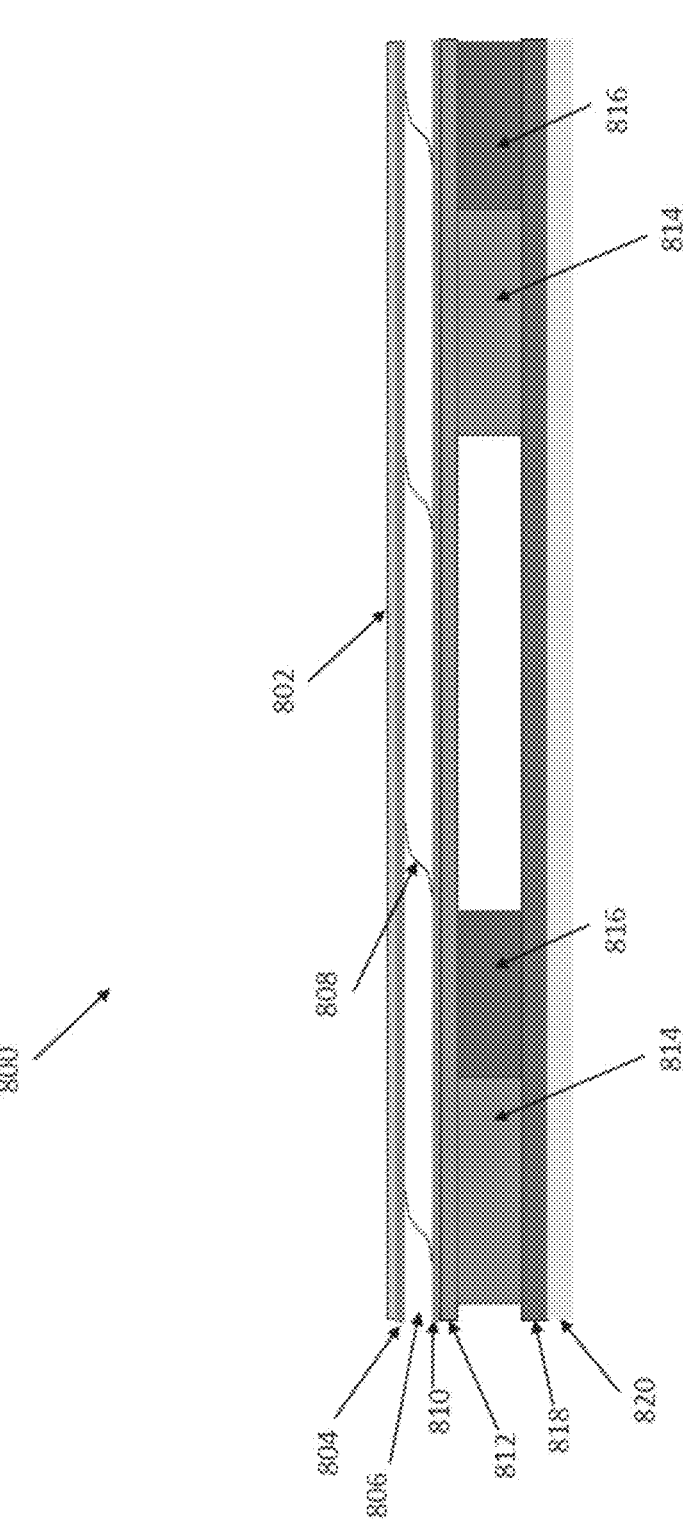
FIG. 7A illustrates a cross section of a layered structure of a computing tile in an orbital server module in accordance with embodiments of the invention.

FIG. 7A illustrates a computing type tile 800 where a first layer of solar cells 802 covers a first external surface of the tile, shown at the top of the illustrated structure. Under the solar cell layer can be a support layer 804 (e.g., 7 micron thick Kapton) that creates a space for a thermal break or "air gap" 806, bounded by another support layer 810 (e.g., 7 micron thick Kapton), from the rest of the structure before the electronic components. The thermal break can be left as empty space maintained by flexible supports 808 between the support layers 804 and 810. Insulation may also be used in this area in some embodiments of the invention. As the surface of the solar cells can reach approximately 100 degrees C. or more, the thermal break layer reduces the flow of heat from the solar cell layer to the electronic components.

Below the thermal break is a printed circuit board (PCB) layer 812 to which the electronic components can be mounted. The processors and other electronic components can be mounted to flexible printed circuit boards (PCBs) in many embodiments of the invention to aid in packaging and deployment. Flexible PCBs can fold and bend to fit in particular shapes and constrained spaces. They are typically made of a thin insulating polymer film having conductive circuit patterns. In other embodiments of the invention, rigid PCBs may be used and have some form of folding mechanisms or flexible connectors for packaging and deployment.

In several embodiments of the invention, the electronic components are distributed more laterally or horizontally rather than stacked, to keep the overall structure preferably thin in accordance with the flat form factor and shape. Electronic components can include processors, memory units, storage units, power converters, and/or networking equipment. As will be discussed further below, different types of tiles can include the same overall layer structure but with different electronic components. The embodiment shown in FIG. 7A includes processor(s) 814 and power converter(s) 816 that provide power to the processors.

Next under the electronic components is a heat spreader layer 818. The heat spreader can distribute waste heat from the individual electronic components across a wider area as a step to dissipate the heat by reducing "hot spots". In some embodiments, thermal pyrolytic graphite (TPG) can be used as a material in the heater spreader, although other materials and heat-spreader technologies may be suitable. Heat pipes or microfluidics may also be used. In many embodiments of the invention, the material and/or structure of the heater spread contacts each electronic component or case or heat-sink thereof, which emits a significant amount of heat.

After the heat spreader is a thermal radiator layer 820. In some embodiments, the thermal radiator is made up of aluminum cladding. In some embodiments, the thermal radiator layer may be simply the outer surface of the heat spreader.

In many embodiments of the invention, the materials that make up the heat spreader and thermal radiator layers should be sufficiently segmented or flexible to enable each tile to be flexible enough for stowing in the deployment package.

Figure 7B:
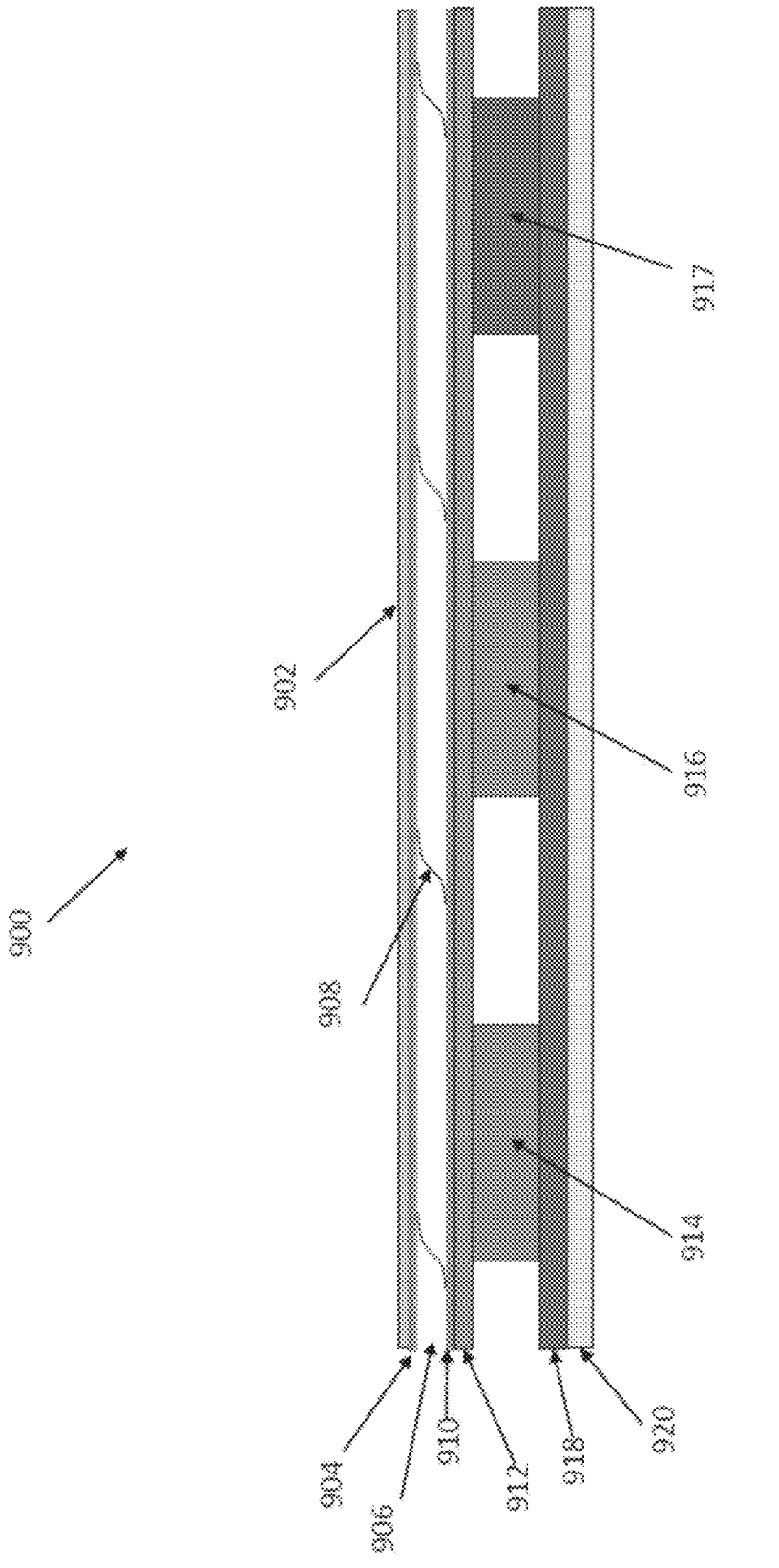
FIG. 7B illustrates a cross section of a layered structure of a support tile in accordance with embodiments of the invention.

FIG. 7B illustrates a support type tile. The support tile includes similar structural components for power collection and heat disposal as a computing tile, but includes supporting electronic components instead of computing components.

A first layer of solar cells 902 covers a first external surface of the tile 900, shown at the top of the illustrated structure. Under the solar cell layer can be a support layer 904 (e.g., 7 micron thick Kapton) that creates a space for a thermal break or "air gap" 906, bounded by another support layer 910 (e.g., 7 micron thick Kapton), from the rest of the structure before the electronic components. The thermal break can be left as empty space maintained by flexible supports 908 between the support layers 904 and 910. Insulation may also be used in this area in some embodiments of the invention. As the surface of the solar cells can reach 100 degrees C. or more, the thermal break layer reduces the flow of heat from the solar cell layer to the electronic components.

Below the thermal break is a printed circuit board (PCB) layer 912 to which the electronic components can be mounted. The electronic components can be mounted to flexible printed circuit boards (PCBs) in many embodiments of the invention to aid in packaging and deployment. In other embodiments of the invention, rigid PCBs may be used and have some form of folding mechanisms or flexible connectors for packaging and deployment.

In several embodiments of the invention, the electronic components are distributed more horizontally rather than stacked, to keep the overall structure preferably thin in accordance with the flat form factor and shape. Supporting electronic components of a support tile can include energy storage such as a printed polymer battery 914, switching/networking electronics 916, and/or power conversion electronics 917.

Next under the electronic components is a heat spreader layer 918. The heat spreader can distribute waste heat from the individual electronic components across a wider area as a step to dissipate the heat by reducing "hot spots". In some embodiments, thermal pyrolytic graphite (TPG) can be used as a material in the heater spreader, although other materials and heat-spreader technologies may be suitable. Heat pipes or microfluidics may also be used. In many embodiments of the invention, the material and/or structure of the heater spread contacts each electronic component or case or heatsink thereof, which emits a significant amount of heat.

After the heat spreader is a thermal radiator layer 920. In some embodiments, the thermal radiator is made up of aluminum cladding. In some embodiments, the thermal radiator may be simply the outer surface of the heat spreader.

In many embodiments of the invention, the materials that make up the heat spreader and thermal radiator layers should be sufficiently segmented or flexible to enable each tile to be flexible enough for stowing in the deployment package.

While specific architectures, configurations, and components are described above with respect to FIGS. 7A and 7B, one skilled in the art will recognize that variations are possible within embodiments of the invention as may be appropriate to a particular application.

Tile Subdivision and Components

In some embodiments of the invention, tiles may be designated as one of two configurations: compute tiles and support tiles. A compute tile can contain, in addition to the structural features common to all tiles, one or more processors and memory within its electronics and computing elements layer as the computing elements of the data center. In further embodiments, a compute tile may also contain energy storage (e.g., a battery) and/or power conversion circuitry. A support tile can contain, in addition to the structural features common to all tiles, networking elements (e.g., switches) and/or energy storage (e.g., battery) within its electronics and computing elements layer. The network elements may be used for communicating to other tiles within the module and/or to other modules (analogous to "top of rack" switches in a conventional data center server). The energy storage may provide power to tiles when power from the solar panels is lacking (i.e., when sunlight is blocked).

Figure 8:
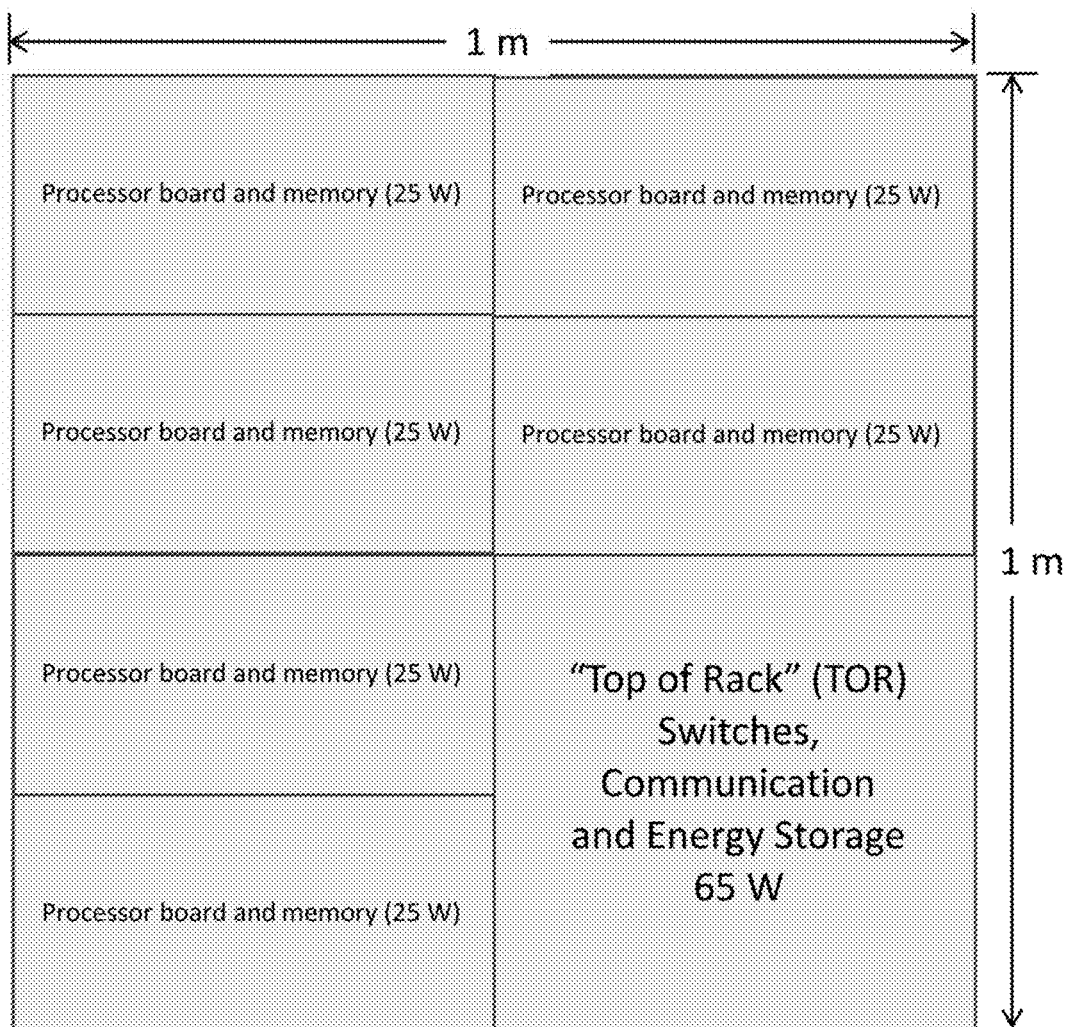
FIG. 8 illustrates a set of tile quads including different tile types in accordance with embodiments of the invention.

In several embodiments of the invention, tiles in a module are subdivided into four regions, referred to as quads. The quads in a group include at least one compute region (compute quads) and at least one support region (support quad). In further embodiments of the invention, three quads in a group are compute regions and one quad in the group is a support region. One such arrangement in accordance with embodiments of the invention is illustrated in FIG. 8. The group includes three quads each having a processor board and memory and one quad having ToR switches, communication, and energy storage. In other embodiments, quads can be arranged and/or grouped in other numbers.

As an example, some embodiments of the invention may utilize a Qualcom AI 100 as the processor. The Qualcom processor has peak integer operations of up to 200 TOPS, while taking 51 cm² of area and consuming 25 W. A solar array area of 817 cm² can provide 25 W of power. Thus, the processor card only takes about 6% of the area of a solar array to power it. The remaining space can be used for cooling, memory, other subsystems, etc. Assuming solar panels can provide 259 W, then 64 W is available to each quad. With a conversion efficiency of 0.8, then 51 W is available for the processors. If a Qualcom AI 100 board consumes 25 W, then this design may allow for placing two on each board. Several embodiments of the invention design for 100 Whr of energy storage. In other embodiments of the invention, any of a variety of other processors (e.g., from Intel, NVidia, etc.) may be utilized as suitable to the particular application. Some tiles in a module may use one type of processor while other tiles another type of processor. Memory on the tiles may be DRAM, flash memory, or any of a number of other types of memory that may be suitable for the processors and data storage.

The processors and other electronic components can be mounted to flexible printed circuit boards (PCBs) in many embodiments of the invention to aid in packaging and deployment. Flexible PCBs can fold and bend to fit in particular shapes and constrained spaces. They are typically made of a thin insulating polymer film having conductive circuit patterns.

Additional embodiments of the invention contemplate other configurations of tiles and sets of tiles within a module.

Figure 9A:
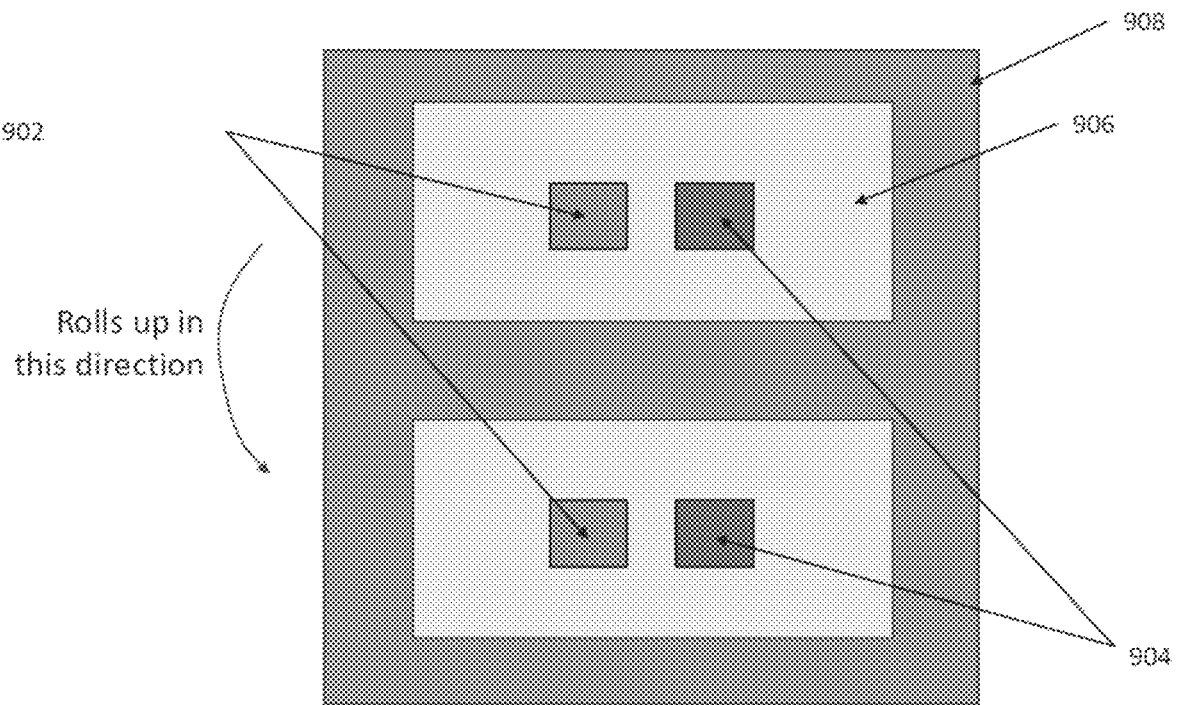
FIG. 9A illustrates a compute tile on a flexible PCB (printed circuit board in accordance with embodiments of the invention.
Figure 9B:
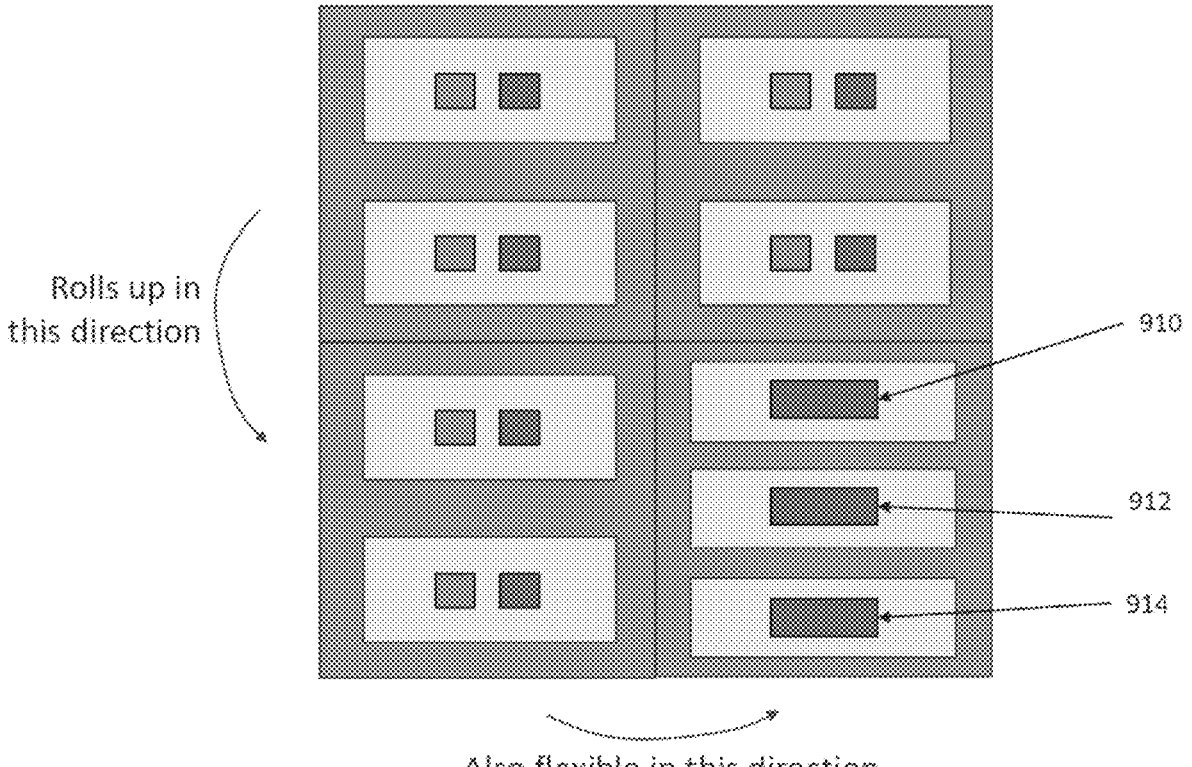
FIG. 9B illustrates three compute quads and a support quad on flexible PCBs in accordance with embodiments of the invention.

As mentioned further above, electronics components can be mounted to a flexible PCB, the flexible nature being an aid in compacting the module for transport into space. FIG. 9A illustrates a compute tile on a flexible PCB (printed circuit board in accordance with embodiments of the invention. The compute tile includes two processors 902, two power processing electronics or converters 904 for providing power to the processors, heat spreader and/or thermal radiator material 906 around the processors 902, and a flexible PCB 908 that they are all mounted to. The flexible PCB may be rolled top to bottom when compacting the module. Similarly, FIG. 9B illustrates three compute quads and a support quad on flexible PCBs in accordance with embodiments of the invention. The three compute quads include components similar to those in FIG. 9A. The support quad includes a battery 910, power conversion circuitry 912, and ToR switches 914. The flexible PCB may be rolled top to bottom and is also flexible left to right. One skilled in the art will recognize that any of a variety of configurations of a tile using a flexible PCB may be utilized in accordance with embodiments of the invention.

Packaging and Deployment

Figure 10:
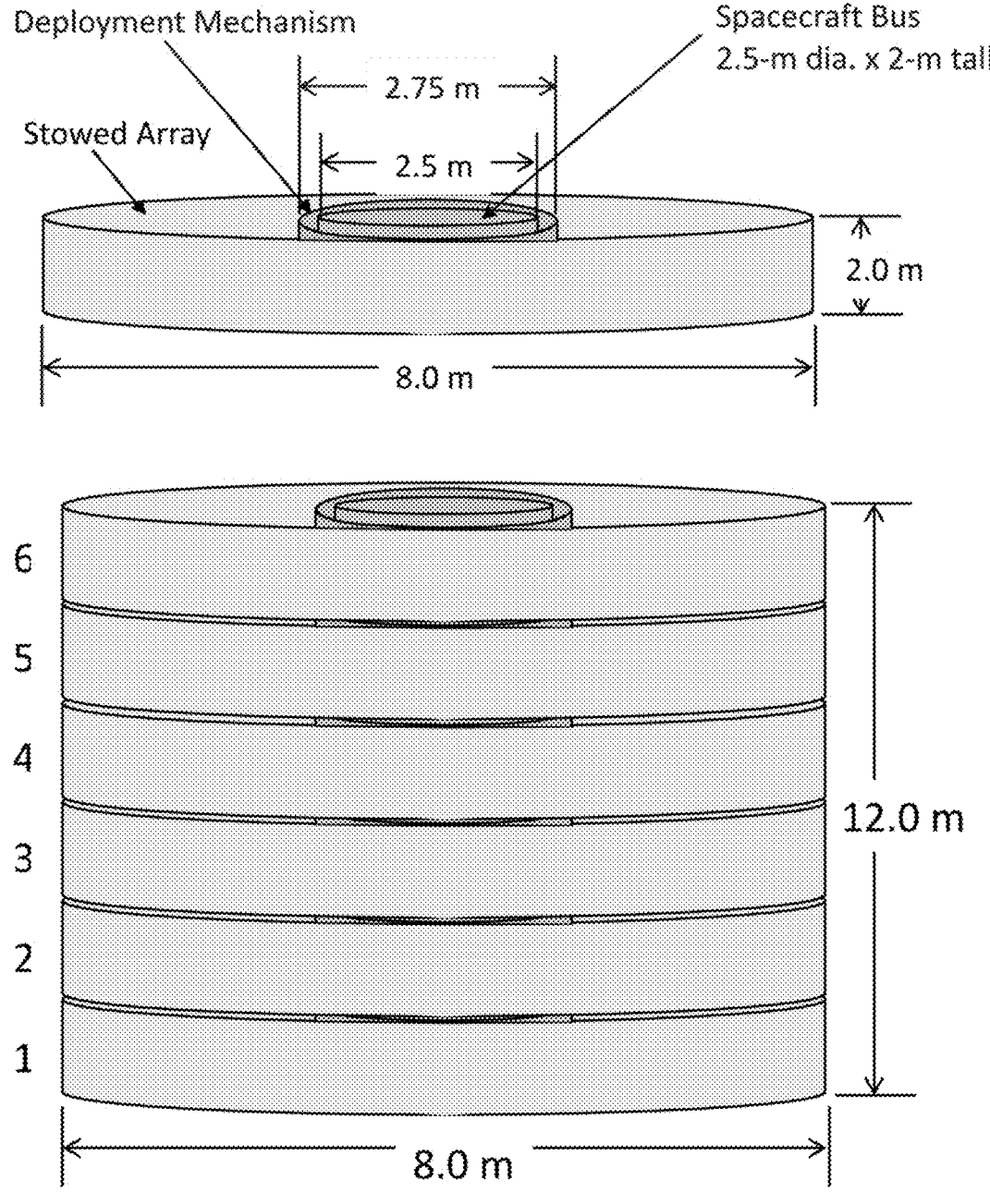
FIG. 10 illustrates a concept for packaging multiple modules on a single launch vehicle in their stowed configuration in accordance with embodiments of the invention.

Orbital server modules in accordance with many embodiments of the invention are built as compactible structures such that the size of a module in one or more dimensions may be reduced during delivery to overcome payload space constraints (e.g. within a launch or delivery vehicle) and then expanded into its final operating configuration. Systems and methods for compactible space structures that may be applied to embodiments of the invention are disclosed in U.S. Pat. No. 10,696,428 to Pellegrino et al. and U.S. Pat. No. 11,772,826 to Pellegrino et al., the relevant disclosures of which are hereby incorporated by reference in their entirety. Further embodiments of the invention may utilize any of a variety of techniques for reducing and expanding the size of modules. Several embodiments are consistent with many large deployable concepts, such as MegaFlex (https://techport.nasa.gov/view/9879), MegaROSA (https://techport.nasa.gov/view/9793), etc. An orbital server module in a compacted configuration for deployment in accordance with several embodiments of the invention is illustrated in FIG. 10.

Each module may use thrusters as propulsion for orbit transfer, deorbiting, station-keeping and attitude control. For example, Hall-effect thrusters such as Halo 12 from Exoterrra may be used in accordance with embodiments of the invention, although any of a variety of other thrusters may be used.

Processes for Deploying Orbital Server Modules

Figure 11:
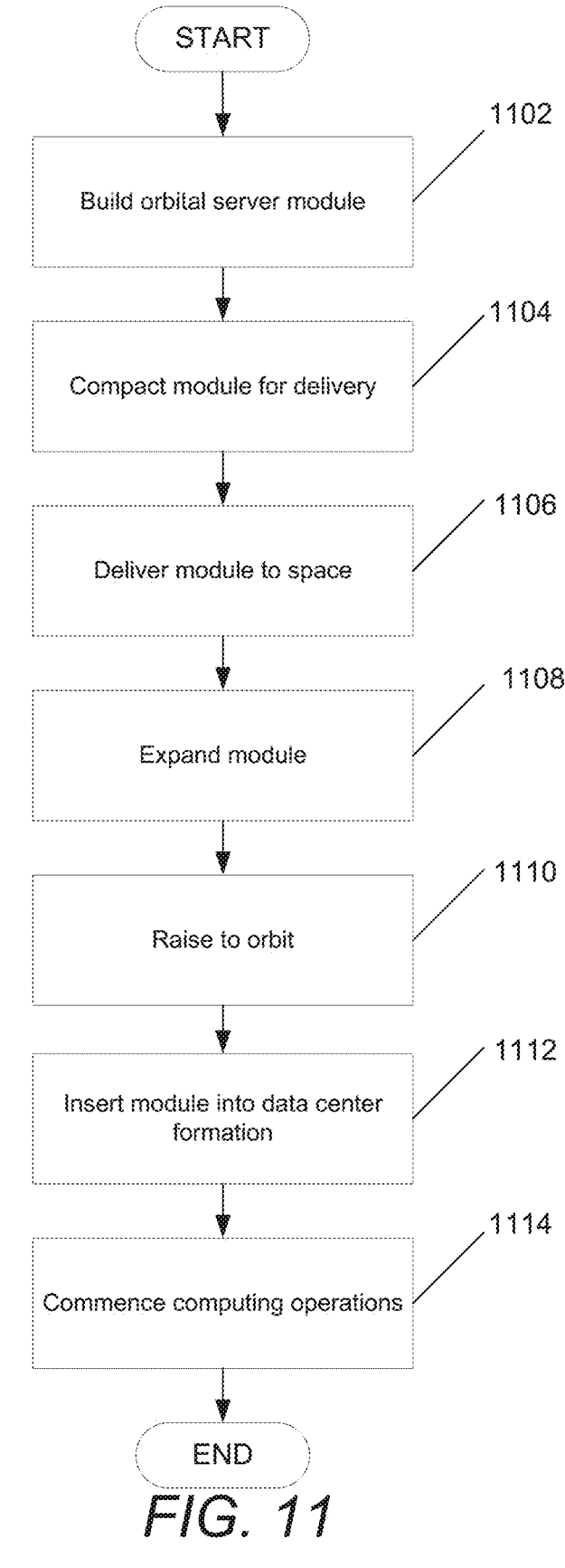
FIG. 11 is a flow chart of a process for deploying orbital server modules in accordance with embodiments of the invention.

A process for deploying orbital server modules in accordance with an embodiment of the invention is shown in FIG. 11. The process 1100 includes building (1102) one or more orbital server modules. Each orbital server module is compacted (1104) into a compacted payload configuration that is small enough to fit in the bay of a launch or transport vehicle. Some embodiments of the invention utilize a starship that can deliver approximately 100,000 kg to a 500-km orbit or vehicle of a similar capability.

The launch or transport vehicle carries (1106) the orbital server module as a payload to either its intended orbit (e.g., 800 km) or to a lower orbit (e.g., 500 km). The payload is deployed and the orbital server module expands (1108) to operational size. If the orbital server module is delivered to a lower orbit, then the onboard propulsion system performs orbit raising (1110) using its thrusters, which can be in a configuration such as described further above. The orbital server module joins (1112) the formation of modules that make up the data center and commences (1114) operation of its computing systems.

While a specific process is described above with respect to FIG. 11, one skilled in the art will recognize that any of a variety of processes may be utilized in accordance with embodiments of the invention.

Processes for Replacing Orbital Server Modules

Figure 12:
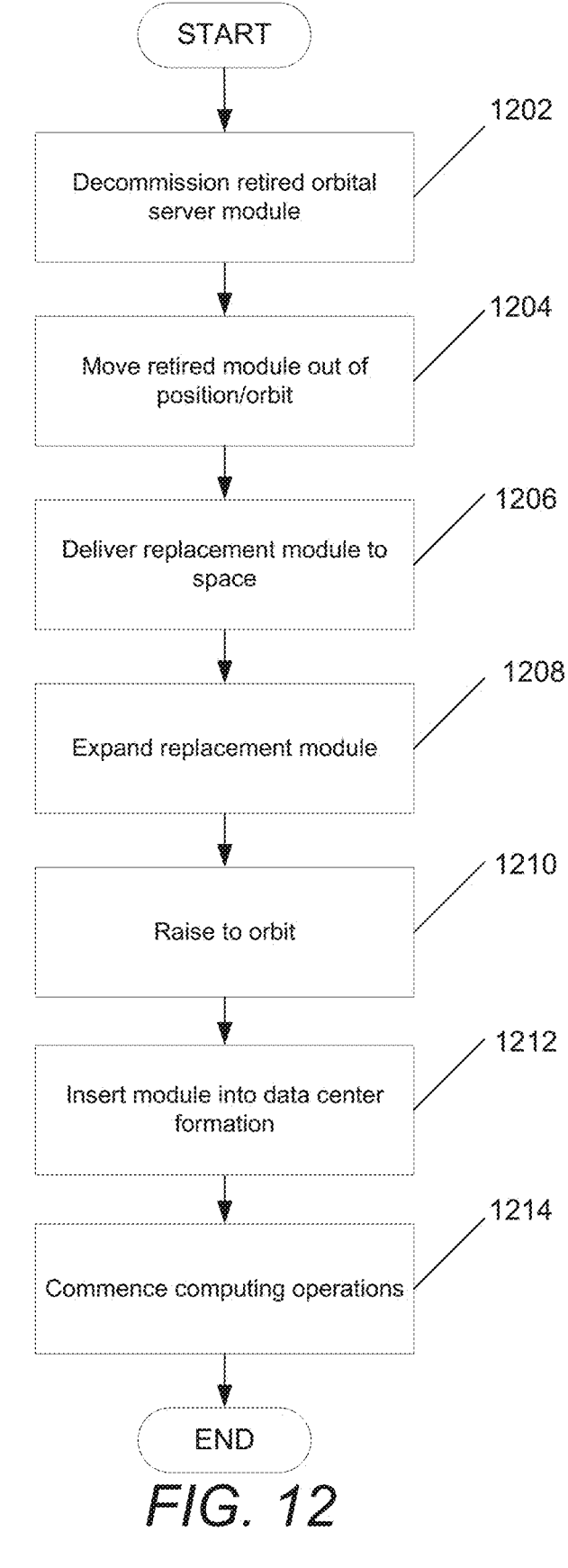
FIG. 12 is a flow chart of a process for replacing orbital server modules in accordance with embodiments of the invention.

A process for replacing an orbital server module in accordance with an embodiment of the invention is shown in FIG. 12. The process 1200 includes decommissioning (1202) an orbital server module to be retired within an formation of orbital server modules that forms a server farm. Decommissioning can include reducing power to certain components within the module, sending an exit signal to notify other modules in the formation that it is being decommissioned, and/or removing addresses of the module's network equipment from routing tables in network configurations. The decommissioned retired orbital server module can move (1204) itself out of orbit and/or position within the formation using its thrusters.

A new orbital server module as a replacement is packaged (e.g., as per processes described above) and delivered (1206) to the orbit of the formation. The replacement module is expanded (1208) to operational configuration. The replacement module uses its thrusters to maneuver (1210) itself into the vacated position of the decommissioned module, or other modules in the formation may rearrange themselves to accommodate the replacement module. The replacement orbital server module joins (1212) the formation of modules that make up the data center and commences (1214) operation of its computing systems.

While a specific process is described above with respect to FIG. 12, one skilled in the art will recognize that any of a variety of processes may be utilized in accordance with embodiments of the invention.

Although the description above contains many specificities, these should not be construed as limiting the scope of the invention but as merely providing illustrations of some of the presently preferred embodiments of the invention.

Various other embodiments are possible within its scope. Accordingly, the scope of the invention should be determined not by the embodiments illustrated, but by the appended claims and their equivalents.

What is claimed is:

1. A space-based data center comprising a plurality of orbital server modules configured to be deployed in space, each module comprising:
   a communication subsystem configured for module-to-module communications to form a complete data center;
   a command subsystem configured to adapt to changing the number of modules in the data center;
   a plurality of tiles arranged in a planar array, where each tile has a layered structure comprising:
      a plurality of solar cells forming a layer across a first surface of the planar array;
      a plurality of thermal radiator panels forming a layer across a second surface of the planar array;
      a plurality of electronic components distributed laterally in a layer between the layer of solar cells and the layer of thermal radiator panels;
      where each electronic component receives power locally from solar cells that are proximate to it and rejects heat to the thermal radiator panel beneath it;
      where a first subset of tiles within the plurality of tiles are compute tiles in which the electronic components include one or more computing processors and memory; and
      where a second subset of tiles within the plurality of tiles are support tiles in which the electronics components include network switches and energy storage.

2. The space-based data center of claim 1, the at least one orbital server module further comprising a heat spreader layer between the thermal radiator panels and the electronic components where material of the heat spreader layer contacts at least some of the electronic components.

3. The space-based data center of claim 2, where the heat spreader layer is made of thermal pyrolytic graphite (TPG).

4. The space-based data center of claim 2, where the heat spreader layer is made of heat pipes.

5. The space-based data center of claim 2, where the heat spreader layer is segmented in a manner to enable the module to be compacted for launch and subsequently deployed.

6. The space-based data center of claim 2, where the heat spreader layer is flexible in a manner to enable the module to be compacted for launch and subsequently deployed.

7. The space-based data center of claim 1, where the thermal radiator panels are made of aluminum cladding.

8. The space-based data center of claim 1, the at least one orbital server module further comprising a thermal break area between the solar cells and the electronic components.

9. The space-based data center of claim 8, where the majority of the thermal break area comprises empty space with supports to maintain structural integrity of the thermal break area.

10. The space-based data center of claim 8, where the majority of the thermal break area comprises thermally insulating materials.

11. The space-based data center of claim 1, where the tiles are positioned in the same orientation such that their solar cells all face the same direction.

12. The space-based data center of claim 1, the at least one orbital server module further comprising a propulsion system comprising a plurality of thrusters configured to propel the module for orbit transfer, attitude control, momentum management, and station keeping.

13. The space-based data center of claim 1, where the electronic components are mounted to flexible printed circuit boards (PCBs).

14. The space-based data center of claim 1, where the orbital server module remains in a compacted configuration until it reaches orbit.

15. The space-based data center of claim 1, where the plurality of tiles arranged in a planar array forms a generally flat and thin shape.

16. The space-based data center of claim 1, where the electronic components of the first subset of tiles include two or more processors.

17. The space-based data center of claim 1, where the electronic components of the first subset of tiles further include power conversion electronics configured to provide power to the computing processors and memory.

18. The space-based data center of claim 1, where the electronic components of the second subset of tiles further include one or more batteries as energy storage.

19. The space-based data center of claim 1, where the network switches of the second subset of tiles are configured to route data between tiles of the first subset of tiles.

20. The space-based data center of claim 1, where the tiles of the first subset of tiles and the second subset of tiles are organized in groups of three tiles from the first subset and one tile from the second subset.

\* \* \* \* \*